United States Patent [19]
Löfmark

[11] 3,879,675
[45] Apr. 22, 1975

[54] COMPENSATING CIRCUIT FOR AN AMPLIFIER ELEMENT, PREFERABLY FOR AN OPERATIONAL AMPLIFIER INCLUDED IN AN ACTIVE FILTER

[75] Inventor: Bengt Gustav Löfmark, Skarholmen, Sweden

[73] Assignee: Telefonaktiebolaget L M Ericsson, Stockholm, Sweden

[22] Filed: Sept. 15, 1972

[21] Appl. No.: 289,294

[30] Foreign Application Priority Data

Dec. 30, 1971 Sweden ............................ 12378/71

[52] U.S. Cl. .................................... 330/109; 330/69
[51] Int. Cl. ............................................... H03f 3/52
[58] Field of Search ................................ 330/69, 109

[56] References Cited

UNITED STATES PATENTS

| | | | |
|---|---|---|---|
| 3,525,949 | 8/1970 | Fjällbrant | 330/109 X |
| 3,577,179 | 5/1971 | West | 330/109 X |
| 3,609,567 | 9/1971 | Webb | 330/109 X |
| 3,643,173 | 2/1972 | Whitten | 330/109 X |
| 3,643,184 | 2/1972 | D'Alessandro | 330/109 X |

OTHER PUBLICATIONS

Text Book, Inter-University Electronic Series, Vol. 11, 1970 – pp. 47–52, "Active Filters: Lumped, Distributed, Integrated, Digital & Parametric".
Electronics, May 27, 1968 – "Activating The Passive RC Network" by Meltzer, pp. 114–118.

*Primary Examiner*—Nathan Kaufman
*Attorney, Agent, or Firm*—Hane, Baxley & Spiecens

[57] ABSTRACT

A compensating circuit for an amplifier element, preferably an operational amplifier included in an active filter comprises a three terminal passive network having a transconductance function with a conjugated complex zero, for example a shunted T-network which is connected to a compensating input and to the output of the amplifier. The components in the network are dimensioned so that the frequency corresponding to the conjugated complex zero of the transconductance function is approximately equal to the pole frequency of the active filter.

3 Claims, 12 Drawing Figures

COMPENSATING CIRCUIT FOR AN AMPLIFIER ELEMENT, PREFERABLY FOR AN OPERATIONAL AMPLIFIER INCLUDED IN AN ACTIVE FILTER

This invention refers to a compensating circuit for an amplifier element, preferably for such an element that is included in an active filter. More precisely, the invention refers to a compensating circuit for an operational amplifier included in an active RC-filter but the compensating circuit can also be used for other types of amplifiers, for example transistor amplifiers.

It is known to realize a filter function which can be obtained with conventional passive RLC-networks by means of so-called active filters. Such filters are built of modules each of which includes active electronic circuits and passive RC-combinations. Consequently space and costs are saved and a higher reliability is achieved in relation to corresponding passive filter constructions. Examples of different types of active filters can be found in the publication "Comparison of methods for active RC-synthesis" by D. Åkerberg, Royal Institute of Technology, Technical Report No. 19, June 1968. Since electronic circuits operational amplifiers are used having an amplification function with a typical amplitude and amplification characteristic, the properties of the amplifier, for example a high amplification and a high input impedance, are preferably used in the dimensioning of the module of the filter. By connecting many modules in cascade, an active filter with the desired properties can be obtained. The operational amplifier included in the module is generally a feed-back amplifier. Such an amplifier due to the combination of a high amplification and phase shift in the amplifier, can be unstable i.e. self-oscillation in the filter can arise. In this connection it is known to counteract this by compensating the amplifier so that its amplification decreases at the pole frequency of the module in consequence of which an improved stability is achieved. A known method for compensation implies that an RC-circuit is connected to the amplifier and is dimensioned in such a way that on the one hand the desired amplification is obtained, and on the other hand a total phase shift, less than 180°, is obtained. The disadvantage of this compensation is that the accuracy of the total filter characteristic decreases, since the module included in the filter is built with regard to the properties of the operational amplifier, i.e. a high amplification. Thus one is led to a comprimise between the demand for stability on one hand, and the demand for accuracy on the other hand.

A closer analysis of the properties of the compensated amplifier has shown that is phase shift is proportional to the slope of the amplitude curve, for example with a value of −180° at a slope of 6*d* B/octave. The compensation then intends to maintain a high amplification in the operational amplifier within a wide frequency band. For an active filter this is generally not necessary since a high amplification is required only at the actual pole frequency. This fact has been utililzed in the compensating circuit according to this invention which will appear from the description below.

Thus the invention refers to a compensating circuit for an amplifier element which preferably is included in an active RC-filter and which circuit permits a high amplification at the pole frequency and furthermore provides a considerably decreased phase shift in the filter below the pole frequency. The invention, the characteristics of which appear from the appended claims, will be described more closely with referece to the accompanying drawing where:

Figure 3:
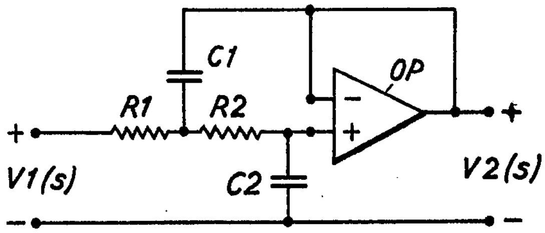
FIG. 3 shows a circuit diagram for a module.
Figure 4A:
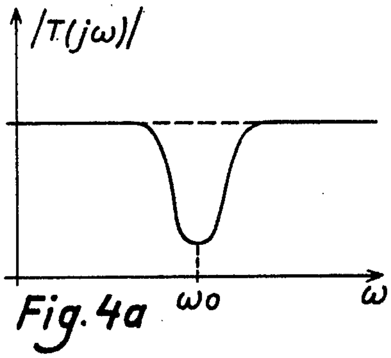

FIGS. 4*a*,*b* show the amplitude and the phase characteristic respectively of the RC-network included in the module according to FIG. 3.

Figure 1:
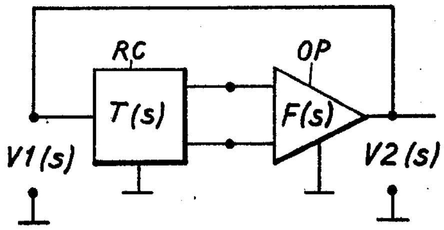
FIG. 1 is a block diagram showing a module included in an active RC-filter of known kind.
Figure 5:
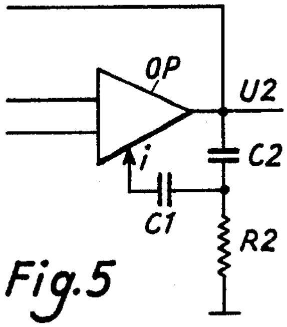

FIG. 5 shows an example of a known compensating circuit for an operational amplifier included in the module according to FIG. 1 or FIG. 3.

Figure 6:
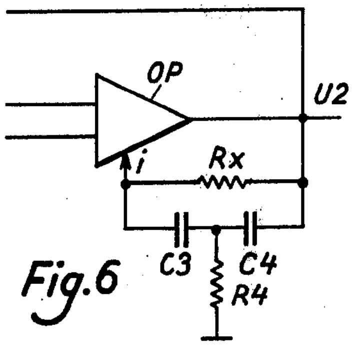

FIG. 6 shows a compensating circuit according to the invention and

Figure 7:
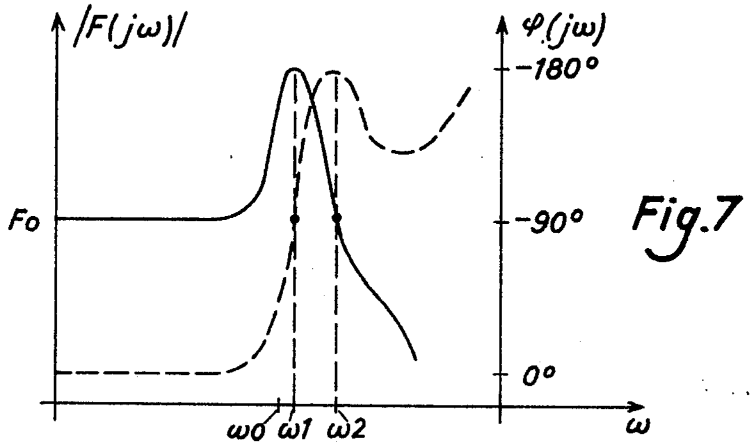

FIG. 7 shows the amplification and the phase characteristic respectively of the compensated amplifier according to FIG. 6.

Figure 8:
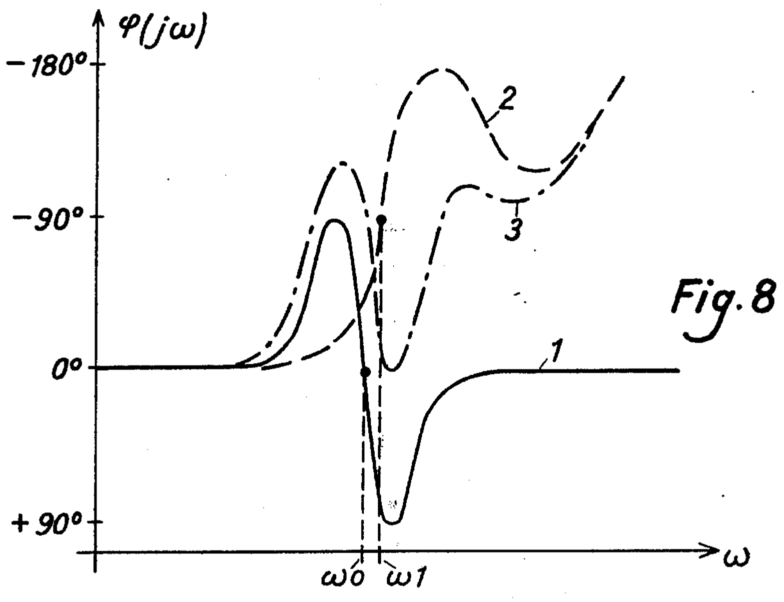

FIG. 8 shows diagrammatically different phase functions of the filter containing the compensating circuit according to the invention and FIG. 9 shows different embodiments of the compensating circuit according to the invention.

Figure 2:
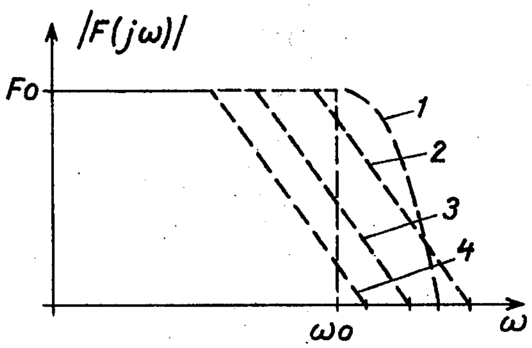
FIG. 2 is a graph showing the amplification characteristic of the operational amplifier included in the module according to FIG. 1.

In the block diagram shown in FIG. 1, RC indicates a passive network including combinations of merely resisitive and and capacitive elements and with a transfer function T(*s*) where *s* is the complex frequency. By OP an operational amplifier is indicated, having the amplification function F(*s*). In dependence on the configuration of the circuits included in the block diagram different filter functions can as known be realized. The amplitude characteristic, i.e. /F(*s*)/ as a function of the frequency ω of the operational amplifier OP is shown in FIG. 2 and from this the amplification of an uncompensated amplfier (curve 1) appears, a high amplification thus being obtained within a wide frequency band. The curves 2,3 and 4 show the amplification for different degrees of compensation, in consequence of which it is achieved that the phase shift of the amplifier is decreased. By ωo is indicated the pole frequency of the filter and it is evident that if the amplifier is compensated, its amplification will decrease at the pole frequency. This has however the consequence that the accuracy of the filter is deteriorated and for this reason it is important to investigate the particular demands for compensation that are required.

FIG. 3 shows an example of a circuit diagram showing an active RC-filter, a so-called unity-gain filter. The filter includes an RC-network consisting of the resistors R1,R2 and the capacitors C1,C2. The network is connected to the two inputs of an operational amplifier OP the output of which is the output of the filter. This filter has a transfer function $$H(s) = \frac{V2(s)}{V1(s)} = \frac{\frac{1}{R1R2C1C2}}{s2 + s\left[\frac{1}{R2C1} + \frac{1}{R1C2}\right] + \frac{1}{R1R2C1C2}}$$

where the pole frequency of the filter $$\omega o = 1/R1R2C1C2$$

and the figure of merit of the filter $$Q = (R1/R2.C1/C2)/(R1/R2 + 1)$$

Figure 4B:
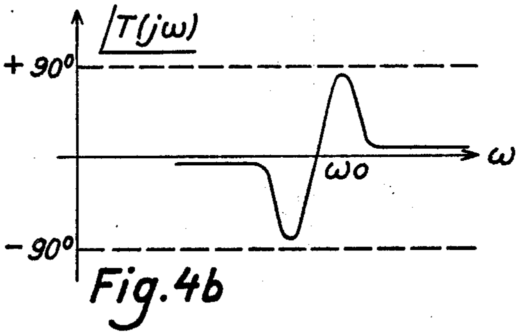

The loop gain of the filter is $Y(s) = T(s).F(s)$ where $T(s)$ is the transfer function of the RC-network with its input short-circuited, and $F(s)$ is the transfer function of the operational amplifier OP. The amplitude and phase characteristic of the transfer function $T(s)$ of the RC-link, is shown in FIGS. 4*a*,*b*. FIG. 4*a* shows that the absolute value of the transfer function $T(s)$ assumes a minimum value for the pole frequency $\omega o$. This implies that the feedback at the frequency $\omega o$ is small, for which reason the amplification of the following operational amplifier must be high so that the properties of the filter in full should not be destroyed. From FIG. 4*b* it appears that certainly the phase shift of the RC-network is low in the immediate neighbourhood of the pole frequency $\omega o$ but rapidly reaches a value of $\pm 90°$ within a slight deviation from said frequency. Thus in order to maintain a high amplification around the pole frequency, the phase shift of the amplifier must be small since the combination high amplification and large phase shift can lead to instability. In order to counteract this, different compensating circuits for the operational amplifier have been proposed. One example of such circuits is shown in FIG. 5. This so-called bipolar compensation consists of a T-link including the capacitors C1,C2 and the grounded resistor R2.

The known compensating circuit shown in FIG. 5 intends on one hand to keep the phase shift of the filter below 180° within the range in which the loop gain exceeds "1", and on the other hand also to maintain a high value of the absolute value $/F(j\omega)/$ within a wide frequency band, compare FIG. 2. From FIG. 4*a* it is however clear that the absolute value of the transfer function $T(j\omega)$ of the RC-network decreases within a range around the pole frequency, for which reason it is essential that $/F(j\omega)/$ is high within this range. According to the idea of the invention the amplifier is therefore compensated with a circuit whose transconductance has a conjugated complex zero equal to or somewhat greater than the pole frequency $\omega o$. This implies that the amplification of the compensated amplifier increases and assumes a maximum value just around the pole frequency $\omega o$ of the filter simultaneously as the phase shift is maintained on a moderate value. The amplification and phase curve respectively of the compensated amplifier is shown in FIG. 7. The frequency corresponding to the zero of the compensating circuit has been indicated by $\omega$1 and this frequency is chosen somewhat greater than $\omega o$. The amplification curve (full line) of the operational amplifier assumes a maximum value at the frequency $\omega$1. The corresponding curve of the phase $\phi(j\omega)$ is dotted. Since according to a known theory, the phase function $\phi(j\omega)$ is the integral of the amplification function $F(j\omega)$ the maximum of $\phi(j\omega)$ will occur for a somewhat higher frequency $\omega$2. For $\omega \geqslant \omega 2$, however, $F(j\omega)$ has decreased so much that the risk of instability in the filter is small. For $\omega \geqslant \omega 2$, the RC-network contributes furthermore a positive phase shift. Consequently $\phi = 180°$ is not achieved until the total loop gain $Y(s)$ has decreased below 1.

As a compensating network with the desired transconductance suitably properties, suitably a shunted T-network according to FIG. 6 can be used. This network has a transconductance $$g2(s) = \frac{i}{U2} = \frac{s^2 + s\left[\frac{1}{RxC1} + \frac{1}{RxC2}\right] + \frac{1}{RxR4C1C2}}{s\left[\frac{1}{C1} + \frac{1}{C2}\right] + \frac{1}{R4C1C2}}$$

while the known compensating circuit according to FIG. 5 has a transconductance $$g1(s) = \frac{i}{U2} = \frac{s^2}{s\left[\frac{1}{C1} + \frac{1}{C2}\right] + \frac{1}{R4C1C2}}$$

The transconductance $g$1 $(s)$ of the known circuit has no zeros whereas the compensating circuit according to the invention has a transconductance having a conjugated complex zero $s = a1 \pm j\,\omega 1$. Since the total amplification $F(s)$ of the compensated operational amplifier can be expressed as $F(s) = Fo.1/g(s)$, where Fo is a real constant a very high total amplification can be achieved at the frequency which corresponds to the zero of the transconductance $g1(s)$ of the compensating circuit simultaneously as the phase shift is maintained low. If $\omega$1 is chosen immediately above $\omega o$ a phase progress will be achieved that appears from FIG. 8. In this diagram the curve 1 indicates the phase function of the RC-network solely, curve 2 the phase function of the compensated amplifier and curve 3 the progress of the total phase function of the filter. Curve 3 is then obtained by the addition of the curves 1 and 2.

It should be emphasized that, in dependence on which type of operational amplifier is used, the compensating circuit is connected to the output of the amplifier or to a further compensating input of the same.

Studies of the Nyquist diagrams showing the loop gain $Y(s) = F(s) \cdot T(s)$ of the filter (see above) for the known and the new compensating circuit show that with the known compensating circuit according to FIG. 5 certainly the curve of $Y(s)$ does not enclose the point +1 but interacts the positive real axis. Thus the filter is conditionally stable and can get into self-oscillation, if the amplification decreases, for example by a decrease of the supply voltage or because the amplifier is overdriven. With the compensating circuit according to the invention the Nyquist curve of $Y(s)$, however, will not intersect the positive real axis and thus the filter is unconditionally stable.

Figures 9A, 9B, 9C:
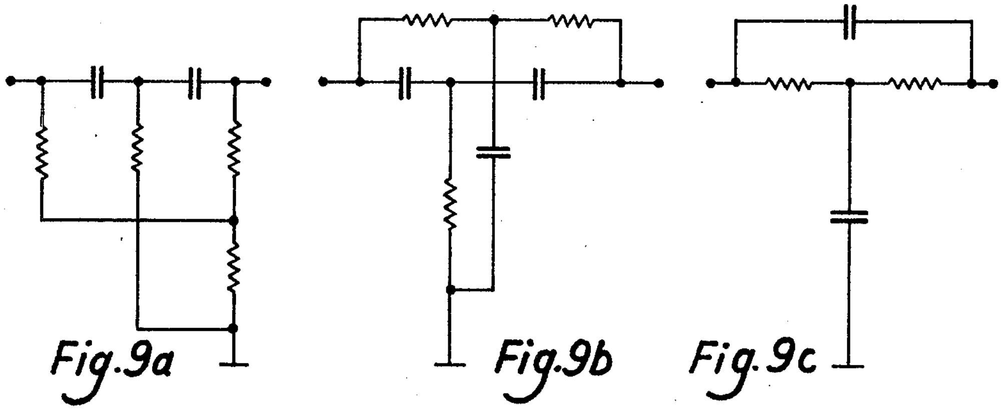

The compensating circuit according to the invention can be realized in many ways. FIGS. 9*a*,*b* and *c* show some examples of these. In each case the left hand terminal is connected to the feedback input of the amplifier and the right hand terminal to the output of the amplifier.

Finally it may be emphasized that the compensating circuit can also be used with a common transistor amplifier. The base electrode and the collector electrode of the transistor are then connected to two terminals of the circuit, while the third terminal is connected to a fixed potential, for example ground.

I claim:

1. An active filter having high amplification at a given pole frequency comprising: a frequency selective passive RC-filter network for determining the center frequency of the filter, said frequency selective RC-filter network having input terminals for receiving an input signal and a feedback signal and output terminals for transmitting a filtered signal; an operational amplifier having input terminals connected to the output terminals of said RC-filter network, an internal compensating input terminal, and an output terminal; feedback means connecting the output terminal of said operational amplifier to at least an input terminal of said passive RC-filter network for feeding back the signal at the output terminal of said operational amplifier to input terminals of said operational amplifier; and a passive compensating network connected between the output terminal of said operational amplifier and the compensating input terminal of said operational amplifier, said passive compensating network comprising at least one shunted T-link and having a transconductance with a conjugate complex zero, the components of said passive network being dimensioned so that the frequency corresponding to said conjugate complex zero is substantially equal to or greater than said pole frequency.

2. An active filter as claimed in claim 1, wherein two of the branches of said T-link consist of capacitors and the third branch consists of a resistor means for connecting said resistor to a reference potential, and a further resistor shunting said T-link.

3. An active filter as claimed in claim 1 wherein two of the branches of said T-link consist of resistors and the third branch consists of a capacitor, means for connecting said capacitor to a reference potential, and a further capacitor for shunting said T-link.

* * * * *